(12) United States Patent
Gruenberger et al.

(10) Patent No.: US 11,752,699 B2
(45) Date of Patent: Sep. 12, 2023

(54) CALIBRATION METHOD AND A DETECTION DEVICE FOR A COATING UNIT OF AN ADDITIVE MANUFACTURING DEVICE

(71) Applicant: EOS GmbH Electro Optical Systems, Krailling (DE)

(72) Inventors: Stefan Gruenberger, Munich (DE); Stefanie Markl, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 393 days.

(21) Appl. No.: 16/922,024

(22) Filed: Jul. 7, 2020

(65) Prior Publication Data

US 2021/0008806 A1    Jan. 14, 2021

(30) Foreign Application Priority Data

Jul. 9, 2019 (DE) .......................... 102019210125.9

(51) Int. Cl.
    *B29C 64/393* (2017.01)
    *B33Y 30/00* (2015.01)
    (Continued)

(52) U.S. Cl.
    CPC ............ *B29C 64/393* (2017.08); *B22F 10/31* (2021.01); *B33Y 30/00* (2014.12); *B33Y 50/02* (2014.12);
    (Continued)

(58) Field of Classification Search
    CPC ....... B29C 64/393; B33Y 30/00; B33Y 50/02; B22F 10/31; B22F 2003/402;
    (Continued)

(56) References Cited

U.S. PATENT DOCUMENTS

2016/0144571 A1   5/2016 Philippi
2018/0093416 A1*  4/2018 Prexler ................. B33Y 10/00
(Continued)

FOREIGN PATENT DOCUMENTS

DE    102013213547    1/2015
DE    102015223474    6/2017
(Continued)

OTHER PUBLICATIONS

German Search Report for Application No. 102019210125.9 dated May 4, 2020, 7 pages.

*Primary Examiner* — Alexander Satanovsky
*Assistant Examiner* — Lynda Dinh
(74) *Attorney, Agent, or Firm* — Seyfarth Shaw LLP (57) ABSTRACT

A calibration method includes positioning the coating unit in a first measuring position and detecting a first position reference value with respect to the reference point and a first measuring point associated with the coating unit at the first measuring position, positioning the coating unit in a second measuring position by moving the coating unit in the direction of movement and detecting a second position reference value with respect to the reference point and a second measuring point associated with the coating unit at the second measuring position, and determining a correction value for the first application element and/or the second application element from the detected first position reference value and the detected second position reference value.

15 Claims, 5 Drawing Sheets

(51) Int. Cl.
  *G05B 19/402* (2006.01)
  *B33Y 50/02* (2015.01)
  *B22F 10/31* (2021.01)
  *G01B 21/04* (2006.01)
  *B22F 3/16* (2006.01)

(52) U.S. Cl.
  CPC ......... *G01B 21/042* (2013.01); *G05B 19/402* (2013.01); *B22F 2003/166* (2013.01); *G05B 2219/49023* (2013.01)

(58) Field of Classification Search
  CPC ............ B22F 2003/166; G01B 21/042; G05B 19/402; G05B 2219/49023
  See application file for complete search history.

(56) References Cited

U.S. PATENT DOCUMENTS

| | | | |
|---|---|---|---|
| 2018/0345412 A1* | 12/2018 | Van Vaerenbergh | ........................ B23K 26/042 |
| 2018/0345582 A1 | 12/2018 | Schade | |
| 2018/0361728 A1* | 12/2018 | Philippi | ................ B33Y 10/00 |
| 2018/0370146 A1 | 12/2018 | Domrose | |
| 2019/0084227 A1* | 3/2019 | Paternoster | ............ B33Y 50/02 |
| 2020/0164588 A1* | 5/2020 | Vaes | ....................... B22F 10/31 |

FOREIGN PATENT DOCUMENTS

| | | |
|---|---|---|
| DE | 102016200043 | 7/2017 |
| DE | WO 2019/081719 A1 * | 5/2019 |

\* cited by examiner

CALIBRATION METHOD AND A DETECTION DEVICE FOR A COATING UNIT OF AN ADDITIVE MANUFACTURING DEVICE

CROSS-REFERENCE TO RELATED APPLICATIONS

This application claims priority to German Patent Application No. DE 10 2019 210125.9, filed Jul. 9, 2019.

TECHNICAL FIELD OF THE INVENTION

The present invention relates to a calibration method for a coating unit of an additive manufacturing device and to a detection device for carrying out such a calibration method, as well as to a manufacturing method for producing a three-dimensional object by layer-wise selective solidification of a building material and to a method of controlling such an additive manufacturing device and a detection device.

BACKGROUND OF THE INVENTION

Manufacturing devices and manufacturing methods of this type are used, for example, in rapid prototyping, rapid tooling or additive manufacturing. An example of such a manufacturing method is known as "selective laser sintering or laser melting". In this method, a thin layer of a building material in powder form is repeatedly applied and the building material is selectively solidified in each layer by selectively irradiating locations that correspond to a cross-section of the object to be produced with a laser beam.

The application of the powder layers is usually implemented by moving a coating device at least over the region in which application of a layer is to take place. The coating device has at least one application element, which can be designed as a blade or roller, for example, and which spreads the building material into a powder layer and/or compacts the applied layer during the movement of the coating device.

Also known in this respect are coating devices which have two application elements spaced from one another in the direction of movement of the coating device. With such a coating device it is for example possible to apply two successive powder (sub-)layers by moving the coating device in opposite directions, i.e. applying the first layer by moving the coating device in a first direction and the second layer by moving the coating device in a second direction opposed to the first direction. With such a coating device, spreading of the building material into a layer can be implemented by the respective application element located ahead or the application element located behind in the direction of movement of the coating device. If the application element located in front spreads the building material into a layer, the rear application element can for example additionally compact the layer.

SUMMARY OF THE INVENTION

In the additive manufacturing process, in order to apply layers of good quality and in accordance with defined specifications, in particular the layer thickness, and/or to reduce or avoid layer defects and variations in the thickness of the layers, it is necessary that the application elements of such a coating device have a pre-known or predefined distance from each other with respect to their height, or are adjusted to the same height at least before or at the beginning of the manufacturing process.

It is therefore an object of the present invention to provide a calibration method for a coating unit of an additive manufacturing device, a detection device for carrying out such a calibration method and an associated manufacturing method for producing a three-dimensional object by selectively solidifying a building material layer by layer, in order to enable an improved layer application and thus a better component quality.

This object is solved by a calibration method, a manufacturing method, a detection device, and a control method. The methods can also be further developed by the features of the devices, which features are given below, or vice versa, and the features of the devices and of the methods each can also be used for further development among one another.

A calibration method according to the invention serves for a coating unit of an additive manufacturing device using a detection device, wherein the additive manufacturing device is configured to produce a three-dimensional object on a building base by applying a building material layer by layer and selectively solidifying the applied layer at locations corresponding to the cross-section of the object to be produced in the respective layer, wherein, for the application of a layer, the coating unit is moved in at least one direction of movement across a build area of the manufacturing device, wherein the coating unit comprises a first application element and a second application element which are spaced from one another in the direction of movement of the coating unit, and wherein the detection device is configured to detect at least one position reference value with respect to a reference point outside the coating unit and a measuring point, the reference point preferably being included by the detection device in an operating state. The method comprising at least the steps of:

a) positioning the coating unit in a first measuring position and detecting a first position reference value with respect to the reference point and a first measuring point associated with the coating unit at the first measuring position, b) positioning the coating unit in a second measuring position by moving the coating unit in the direction of movement and detecting a second position reference value with respect to the reference point and a second measuring point associated with the coating unit at the second measuring position and c) determining a correction value for the first application element and/or the second application element from the detected first position reference value and the detected second position reference value.

In general, the calibration method can also be referred to as an adjustment method.

The first and/or second application element of the coating device is preferably used to define a layer of the building material. This includes spreading of the building material into a layer and/or a compaction effect on the layer of the building material and is hereinafter also referred to as the application of a layer of the building material. The first and/or second application element can, for example, comprise a roller and/or a blade and/or a flexible application element, such as a brush and/or a lip and/or a doctor blade. Preferably, the first and the second application element each comprises a roller, more preferably the first and the second application element are each designed as a roller. If the application elements are designed as application rollers, the present invention may be particularly advantageous, for example, since, when using roller-shaped elements, other measuring or calibration methods can be more difficult to implement and/or can contain large measuring errors. Furthermore, a roller is preferably cylindrical and regular in shape and has a substantially smooth surface.

When using one or more rollers as application element(s), which can be provided on the coating unit so as to be rotatable about a longitudinal axis in order to apply a layer, the application roller(s) is or are preferably fixed while the calibration process is carried out. This means that the angular position of each application roller is defined and is not changed during the calibration process. This makes it possible, for example, to improve the accuracy of the calibration method, since the reference line or the reference plane, which defines the first and second measuring points as described below, remains constant. The angular position in which the application roller(s) is/are fixed is further preferably defined in advance and is particularly preferably determined by determining the position reference values during one revolution of the respective application roller, for example as the angular position corresponding to the mean value of the position reference values determined in this way.

The coating unit is preferably an element or a unit of a coating device provided in the additive manufacturing device. Further preferably, the coating device comprises, in addition to the coating unit, at least one further element, for example a powder container. The further element can, for example, be provided so that it can be uncoupled from the coating device and/or be designed so that it can be moved or carried along with the coating unit in the direction of movement.

The position reference value detected by the detection device can, for example, generally be a measured value which is detected by the detection device. Such a measured value can, for example, be a voltage and/or a force, in particular a spring force, and/or an angle and/or a length and/or any other measurable physical quantity. Preferably, the position reference value is a measure for a space or a distance between the measuring point and the reference point and/or between the reference point and the measuring point, more preferably the position reference value is proportional to this distance. In general, the position reference value is preferably a position difference value or a position ratio value. A position difference value further preferably comprises a difference between a first (measured) value assigned to the reference point and a second (measured) value assigned to the measuring point. A position ratio value further preferably comprises a ratio, i.e. a quotient, of a first (measured) value assigned to the reference point to a second (measured) value assigned to the measuring point.

The detection device can, for example, be configured to calculate from the position reference value a value for the distance (also referred to as distance value) between the measuring point and the reference point and/or between the reference point and the measuring point, for example by means of an internal data processor of the detection device or by means of an external data processor. Alternatively or additionally, the detection device can have a display device for displaying the position reference value or values. For detecting the position reference value, the detection device preferably comprises a suitable sensor.

For example, the first and/or second position reference value can also be zero. In particular, the first position reference value can be chosen to be zero, i.e. the zero point of a scale of the detection device can be set to the first measuring point. Alternatively or additionally, the reference point and the first measuring point can be identical and/or the reference point and the second measuring point can be identical.

Detection of the position reference value can, for example, be a direct measurement and/or a calculation from several measurements and/or any other derivation. The assignment of the first and second measuring points to the first and second measuring positions, respectively, is preferably performed according to the same rules, i.e. in the same or a constant reference system, so that in particular during detection of the position reference value only the first and the second measuring points are variables.

As mentioned above, the reference point is preferably included by the detection device in an operating state. Such an operating state can, for example, be a relaxed spring of the detection device, which then corresponds to a zero force value. The reference point has a defined position relative to the detection device when the latter is arranged in its intended position. The reference point can be a spatial coordinate which is located, for example, on the surface of the detection device. The measuring point can be a spatial coordinate which is determined by a measurement, i.e. is not determined until the measurement is performed. The reference point and/or the measuring point is not necessarily a geometric point but can also generally be a location.

The correction value determined in step c) is preferably a height value, i.e. a coordinate point on an axis perpendicular to the direction of movement. Further preferably, the correction value is a measure for a height adjustment of the first and/or second application element. The term "height" here means a vertical position or orientation, wherein the vertical direction is preferably perpendicular to the direction of movement of the coating unit. The vertical direction is preferably defined by a building progress in the additive manufacturing process, i.e. a direction in which the selectively solidified layers of the building material come after one another.

Preferably, the detection device is an element that is formed separately from the building base. Therefore, the detection device is preferably not the building base.

As described above, the first measuring position and the second measuring position are spaced from one another in the direction of movement of the coating unit. In the calibration method described, the correction value is therefore preferably determined in relation to the direction of movement of the coating unit. This makes it possible, for example, to set or adjust the height of the two application elements relative to one another in relation to the direction of movement of the coating unit. If, for example, the application elements or their boundary facing the building base (e.g. a lower edge of the application elements) are set to substantially the same height in the calibration process, it is possible, for example, to align the application elements or their boundary facing the building base substantially parallel to the direction of movement. Altogether, in a subsequent additive manufacturing process, for example, the quality and/or dimensional accuracy and/or reproducibility of the applied layers of the building material can be improved.

Preferably, the position reference value detected by the detection device includes information about a vertical position of the measuring point. Preferably, the first position reference value includes information on a vertical position of the first measuring point and the second position reference value includes information on a vertical position of the second measuring point. The vertical direction is preferably a direction perpendicular to the build area and/or to the building base. Preferably the vertical direction is perpendicular to a plane defined by the direction of movement of the coating unit and a longitudinal extension of the first and/or second application element. As already mentioned above, the vertical direction is preferably also a direction of the building progress in the additive manufacturing process. As a result of the position reference value including information about a vertical position of the measuring point, it is possible, for example, to provide a correction value which provides a height correction, i.e. a position correction in relation to height, for the first and/or second application element.

Preferably, the detection device is mounted in the manufacturing device temporarily and fixed in place, more preferably attached to the building base of the manufacturing device. Further preferably, the detection device is mounted in the manufacturing device at least during the period of carrying out the calibration process. Alternatively or additionally, the detection device is further preferably mounted in the manufacturing device in a removable manner. For example, it can be removed from the manufacturing device or at least a building space of the same during a process of additive manufacturing of a three-dimensional object. This makes it possible, for example, to perform the calibration process in a simple manner. The step of mounting the detection device in the manufacturing device is preferably done manually by a user. The other steps of the calibration method, which have been described above and are described below, can be carried out manually by a user and/or automatically. Here, the term "automatically" means without any user intervention, i.e. in particular by means of a data processor and appropriate software (computer program).

For example, the detection device can be part of a calibration device, the calibration device comprising, in addition to the detection device, further devices or units for calibrating or adjusting the coating unit and/or a solidification device of the manufacturing device and/or the building base and/or further units or devices of the additive manufacturing device, in particular for aligning them with respect to one another. The step of mounting the detection device in the manufacturing device is preferably performed within the frame of mounting or introducing the calibration device in the additive manufacturing device, in particular in a process chamber of the additive manufacturing device.

Preferably, the calibration method is carried out at least partially automatically, in particular by means of a computer program executed on a data processor.

Preferably, the first and/or second measuring point(s) is/are a point of intersection of a common reference line of the first and second application element and/or of a common reference plane of the first and second application element with a predefined comparison line, the predefined comparison line including the reference point and extending in a predefined direction, the predefined direction preferably being the vertical direction. Further preferably, the reference line is a tangent to the surfaces of the first and second application elements, which surfaces face the building base during operation, or is arranged parallel to a tangent to the surfaces of the first and second application elements, which surfaces face the building base during operation. Alternatively or additionally, the reference plane is further preferably a tangential plane to the surfaces of the first and second application elements, which surfaces face the building base during operation, or is arranged parallel to a tangential plane to the surfaces of the first and second application elements, which surfaces face the building base during operation. Alternatively or additionally, the reference point, the first measuring point and the second measuring point are further preferably located on the comparison line. For example, the reference point and/or the first measuring point and/or the second measuring point can be fixed in place by means of the reference line.

Alternatively or additionally it is further preferred that the detection device comprises at least one measuring element extending in a longitudinal direction, preferably a measuring roller, whose surface facing the building base during operation determines the reference line, wherein the detection device still further preferably comprises a pressing device for bringing and/or holding the measuring element in contact with the first and second application element and/or wherein the measuring element is still further preferably provided at the detection device in a manner tiltable about an axis transverse, preferably perpendicular, to the longitudinal direction.

The surface of the first or second application element, which surface faces the building base, can, for example, be a bottom side or bottom edge or bottom face of the application element. In particular, the tangent or tangential plane to the surface of the first or second application element, which surface faces the building base during operation, can be non-parallel to a horizontal plane, i.e. can be at an angle to the horizontal plane, the horizontal plane being defined as a plane perpendicular to the vertical direction. The term "during operation" means the intended operation or use of the coating unit, for example during application of a layer of the building material. Preferably, the tangent or tangential plane contacts the first and second application element at a first and second point of contact respectively.

As an alternative to mounting the measuring element in a manner tiltable about an axis, the measuring element can also be provided on a parallelogram suspension or the like. Instead of a measuring roller, the measuring element can be designed as a flat measuring element, such as a cuboid or a thin plate.

This, for example, provides for a calibration method that can be carried out in a simple manner. The reference line or reference plane can, for example, provide a defined connection between the two application elements, at which reference line or reference plane the measuring point is provided. This makes it possible, for example, to provide measuring points that are not located on the application elements themselves.

Alternatively or additionally, the detection device preferably comprises at least one measuring element. Further preferably the measuring element comprises a surface which during operation faces the first and the second application element and which is in contact with the first and the second application element at least temporarily, and a surface which during operation faces away from the first and the second application element and which is preferably provided on a side of the measuring element opposite the surface facing the application elements. The surface of the measuring element facing away from the first and the second application element during operation is preferably a surface of the measuring element facing the building base. The term "during operation" means the intended operation or use of the detection device, in particular while the calibration process is carried out. Still further preferably, the first and second measuring points are located on the surface of the measuring element facing away from the first and second application element during operation. Alternatively or additionally, the surface facing the first and second application element is still further preferably in contact with the first and second application element as a tangent and/or tangential plane. This means in particular that the surface facing the application elements contacts the first application element at at least one first contact point and contacts the second application element at at least one second contact point and the tangent or tangential plane passes through the at least first and second contact points.

During operation, the detection device is preferably provided in an area between the application elements and the building base, i.e. the measuring element contacts the application elements from below.

As a result of the measuring element having a defined geometry, the surface of the measuring element that faces the application elements and the surface of the measuring element that faces away from the application elements are preferably in a fixed geometric relationship or orientation (angle, distance, etc.) to one another. The surface of the measuring element facing away from the application elements preferably defines a common reference plane or a common reference line of the first and second application element. Further preferably, the first and/or the second measuring point(s) is/are a point of intersection of the common reference line of the first and the second application element and/or of the common reference plane of the first and the second application element with a predefined comparison line, the predefined comparison line including the reference point and extending in a predefined direction, the predefined direction preferably being the vertical direction. Still further preferably, the reference point, the first measuring point and the second measuring point are located on the comparison line. For example, the reference point and/or the first measuring point and/or the second measuring point can be fixed in place by means of the reference line.

The measuring element is preferably a measuring element extending in a longitudinal direction and/or a measuring roller. Alternatively or additionally, the detection device preferably comprises a pressing device which is configured to bring and/or hold the measuring element in contact with the first and second application element. Alternatively or additionally, the measuring element is provided at the detection device in a manner tiltable about an axis, the axis being transverse, preferably perpendicular, to the longitudinal direction of the measuring element and/or the axis being transverse, preferably perpendicular, to the direction of movement of the coating unit. As an alternative to mounting the measuring element in a manner tiltable about an axis, the measuring element can also be provided on a parallelogram suspension or the like, for example. Instead of a measuring roller, the measuring element can be designed as a flat measuring element, such as a cuboid or a thin plate.

This, for example, provides for a calibration method that can be carried out in a simple manner. The reference line or reference plane can, for example, provide a defined connection between the two application elements, at which connection the measuring point is provided. This makes it possible, for example, to provide measuring points that are not located on the application elements themselves.

According to an alternative embodiment of the invention, the detection device comprises a connecting element. The connecting element preferably establishes a defined geometrical relationship between a first surface of the first application element, which first surface is designed to define a layer height, and a second surface of the second application element, which second surface is designed to define a layer height, and/or between an axis of rotation of the first application element and an axis of rotation of the second application element. Preferably, as a position reference value, a distance between the first surface of the first application element, which first surface is designed to define a layer height, and the second surface of the second application element, which second surface is designed to define a layer height, and/or a distance between the axis of rotation of the first application element and the axis of rotation of the second application element is determined by means of the detection device in a direction which is arranged perpendicular to a straight line defined by the direction of movement of the coating unit. Preferably, the distance between the first surface and the second surface is determined using the connecting element which, for this purpose, comprises a surface which lies in a plane or which extends at least partially straight, wherein the planar or straight region of the surface of the connecting element at least partially contacts the first and second surfaces of the application elements during the intended operation of the detection device. Preferably, the first and the second application elements are designed as rollers with the same radius, i.e. the same distance of the lateral surface as first and second surface to the axis of rotation.

Preferably, the first and/or the second measuring point is a point of intersection of a comparison line with the surface of the first or second application element, which surface faces the building base during operation, wherein the comparison line includes the reference point and extends in a predefined direction, the predefined direction preferably being the vertical direction. Further preferably, step b) is carried out several times in order to detect a plurality of position reference values at a plurality of measuring positions, and in step c) the correction value is determined from the plurality of detected position reference values, wherein still further preferably the detection of the plurality of position reference values is carried out continuously during the movement of the coating unit in the direction of movement or in successive steps. Alternatively or additionally, it is further preferred that the detection device comprises a radiation source which emits an electromagnetic beam, preferably a laser beam, and a detector for detecting the electromagnetic beam, in particular the electromagnetic beam reflected at the measuring point.

This makes it possible, for example, to provide a calibration method in which measuring points are detected which are located on the surface of the application elements. This makes it possible, for example, to use a non-contact measuring method to detect the measuring points or the position reference values.

The correction value is preferably determined based on a geometric calculation and/or a difference between the first position reference value and the second position reference value.

Alternatively or additionally, further information can be used to determine the correction value, for example a distance by which the coating unit moves along the direction of movement from the first measuring position to the second measuring position and/or an angle which the above-mentioned reference line or reference plane forms with the horizontal plane. This provides, for example, various methods for determining the correction value.

Preferably, after determining of the correction value, in a further step d) a position setting of the first and/or second application element is adjusted according to the determined correction value. The position setting can be made in particular with regard to the vertical position of the first and/or second application element. This makes it possible, for example, to set a desired relative height of the application elements to one another and/or to set the application elements substantially at the same height. If the height difference between the application elements is essentially zero, i.e. the application elements are substantially at the same height, then in the calibration method according to the invention, preferably the first and the second measuring points are substantially identical and thus the first and the second position reference values determined in step a) and step b) described above are substantially the same. The tangent or tangential plane described above, which contacts the first and the second application element at a first or second contact point respectively, is then preferably aligned substantially horizontally, or that is to say, the first and second contact points then preferably correspond to a lowest point of the application elements, i.e. the contact points are located on a boundary of the application elements, which boundary faces the building base.

Further preferably, steps a) to d) are carried out iteratively, wherein a number of iterations is predefined and/or steps a) to d) are carried out iteratively until the correction value falls below a predefined threshold value. The iterative approach makes it possible, for example, to compensate for measurement errors and/or structural and/or process-related irregularities, for example tilting of the longitudinal axes of the application elements relative to one another and/or unevenness of the surfaces of the application elements and/or deviations of the comparison line from the predefined direction.

According to a further aspect, a computer program is provided which comprises program code means for executing at least part of the steps, preferably all steps, of a calibration method described above when the computer program is executed on a data processor, in particular on a data processor cooperating with the additive manufacturing device and the detection device.

According to a further aspect, a control unit for an additive manufacturing device is provided, wherein the additive manufacturing device is configured for the production of a three-dimensional object on a building base by applying a building material layer by layer and selectively solidifying the applied layer at locations corresponding to the cross-section of the object to be produced in the respective layer, and the manufacturing device comprises a coating unit which is provided so as to be movable in at least one direction of movement across a build area of the manufacturing device for applying a layer, wherein the coating unit comprises a first application element and a second application element, which are spaced from one another in the direction of movement of the coating unit, and a detection device is mountable and/or can be positioned in the additive manufacturing device, wherein the detection device is configured to detect at least one position reference value with respect to a reference point outside the coating unit and a measuring point, the reference point preferably being included by the detection device in an operating state, and wherein the control unit is adapted to control the manufacturing device and the detection device to perform at least steps a) and b), preferably steps a) and b) and further steps, of a calibration method described above. Preferably step c) is performed by the control unit.

A manufacturing method according to the invention serves to produce a three-dimensional object in an additive manufacturing device on a building base by applying a building material layer by layer and selectively solidifying the applied layer at locations corresponding to the cross-section of the object to be produced in the respective layer, wherein, for the application of a layer, a coating unit provided in the manufacturing device is moved in at least one direction of movement across a build area of the manufacturing device. The coating unit comprises a first application element and a second application element which are spaced from one another in the direction of movement of the coating unit. The manufacturing device further comprises a detection device which is configured to detect at least one position reference value with respect to a reference point outside the coating unit and a measuring point, the reference point preferably being included by the detection device in an operating state. At least once, preferably prior to the manufacture of the three-dimensional object, a calibration method described above is carried out.

A detection device according to the invention is configured to carry out a calibration method for a coating unit of an additive manufacturing device, wherein the additive manufacturing device is configured for the production of a three-dimensional object on a building base by applying a building material layer by layer and selectively solidifying the applied layer at locations corresponding to the cross-section of the object to be produced in the respective layer, and wherein, for applying a layer, the coating unit is provided so as to be movable in at least one direction of movement across a build area of the manufacturing device and the coating unit comprises a first application element and a second application element which are spaced from one another in the direction of movement of the coating unit. The detection device is configured to detect at least one position reference value with respect to a reference point outside the coating unit and a measuring point, the reference point preferably being included by the detection device in an operating state, and wherein the detection device is designed and/or controlled to carry out a calibration method described above.

A method according to the invention serves to control an additive manufacturing device and a detection device provided in the manufacturing device, the additive manufacturing device being configured to produce a three-dimensional object on a building base by applying a building material layer by layer and selectively solidifying the applied layer at locations corresponding to the cross-section of the object to be produced in the respective layer, and the manufacturing device comprising a coating unit which is provided so as to be movable in at least one direction of movement across a build area of the manufacturing device for applying a layer and which comprises a first application element and a second application element which are spaced from one another in the direction of movement of the coating unit. The detection device is configured to detect at least one position reference value with respect to a reference point outside the coating unit and a measuring point, the reference point preferably being included by the detection device in an operating state. The detection device and the manufacturing device are controlled to perform at least the steps of:
  a) positioning the coating unit in a first measuring position and detecting a first position reference value with respect to the reference point and a first measuring point associated with the coating unit at the first measuring position,
  b) positioning the coating unit in a second measuring position by moving the coating unit in the direction of movement and detecting a second position reference value with respect to the reference point and a second measuring point associated with the coating unit at the second measuring position, and
  wherein in a further step c) a correction value for the first application element and/or the second application element is determined from the detected first position reference value and the detected second position reference value.

By means of the computer program, the control unit, the manufacturing method, the detection device and/or the control method described above it is possible, for example, to achieve the effects described above with regard to the calibration method, too.

BRIEF DESCRIPTION OF THE DRAWINGS

Further features and expediencies of the invention are apparent from the description of exemplary embodiments with the aid of the attached drawings.

DETAILED DESCRIPTION OF THE EMBODIMENTS

Figure 1:
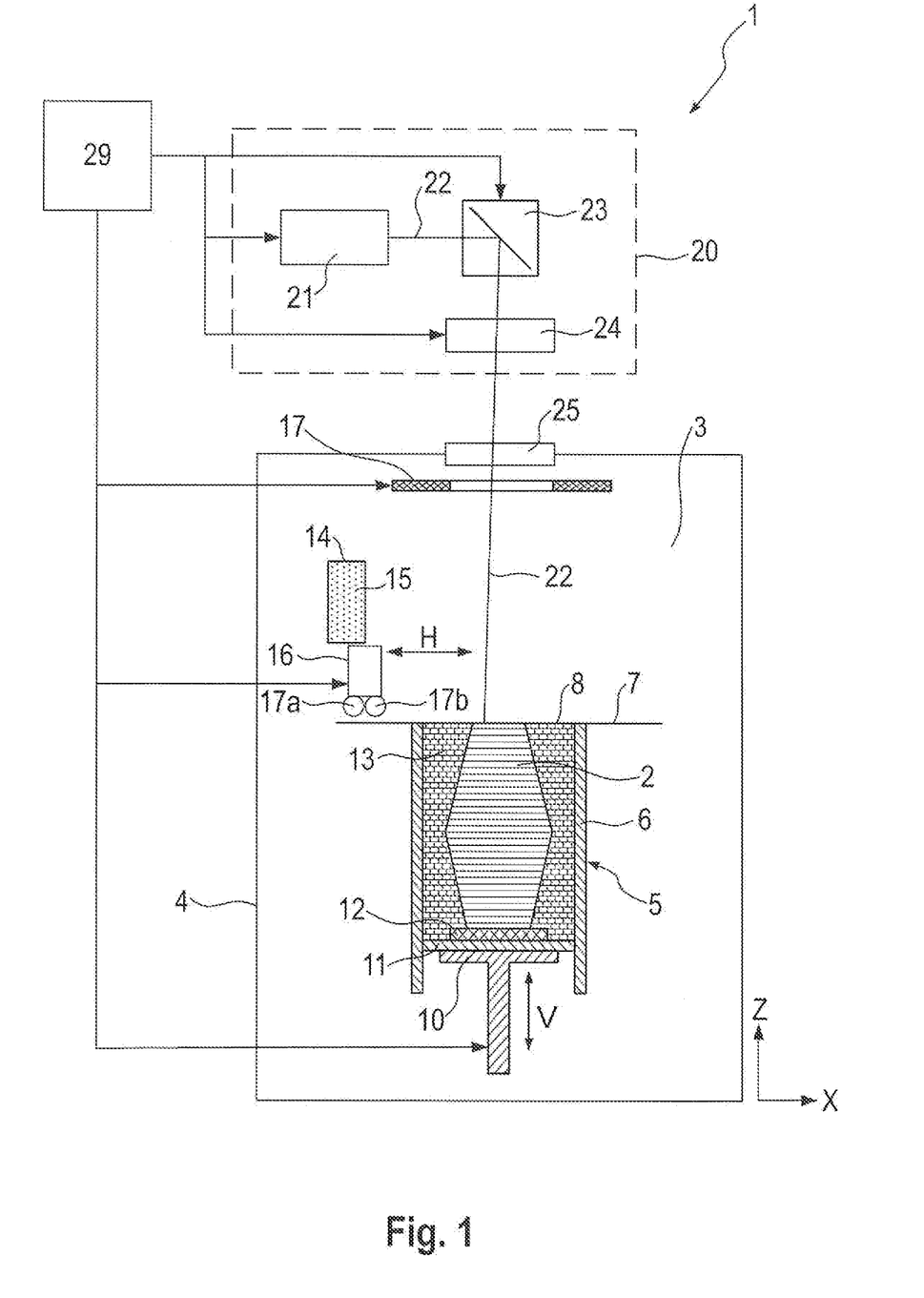
FIG. 1 shows a schematic view, partially in cross-section, of a device for additive manufacturing of a three-dimensional object, in which device the present invention can be applied.

In the following, an exemplary additive manufacturing device is described with reference to FIG. 1, in which device the present invention can be applied. The device shown in FIG. 1 is a laser sintering or laser melting device 1. For producing an object 2, it comprises a process chamber 3 with a chamber wall 4.

In the process chamber 3 a container 5 is arranged that is open to the top and has a container wall 6. A working plane 7 is defined by the upper opening of the container 5, wherein the region of the working plane 7 located within the opening which can be used for building the object 2 is referred to as build area 8.

A support 10 that can be moved in a vertical direction V is arranged in the container 5, to which support a base plate 11 is attached which seals the container 5 to the bottom and thus forms the bottom thereof. The base plate 11 can be formed as a plate separately from the support 10 and attached to the support 10, or it can be formed integrally with the support 10. Depending on the powder and process used, a building platform 12 can also be attached to the base plate 11 as a building base on which the object 2 is built. However, the object 2 can also be built on the base plate 11 itself, which then serves as a building base. In FIG. 1, the object 2 to be formed in the container 5 on the building platform 12 is shown below the working plane 7 in an intermediate state with several solidified layers, surrounded by building material 13 that remained unsolidified.

The laser sintering or laser melting device 1 further contains a storage container 14 for a building material 15 in powder form which can be solidified by electromagnetic radiation, and a coating device 16 that can be moved in a horizontal direction H, hereinafter referred to as direction of movement H, for applying the building material 15 within the build area 8. On its bottom, i.e. the side facing the build area 8 or the building base, two application elements designed as application rollers 17a, 17b are provided on the coating device 16. The application rollers 17a, 17b are substantially cylindrical in shape and extend in a longitudinal direction transversely, preferably perpendicularly, to the direction of movement H of the coating device 16 (in FIG. 1 into the drawing plane). The application rollers 17a, 17b are spaced from one another in the direction of movement H. The application rollers 17a, 17b each have a longitudinal axis (not shown in the figures), around which they are rotatably provided on the coating device 16. Furthermore, at least one of the application rollers 17a, 17b is arranged on the coating device 16 in a height-adjustable manner, i.e. a vertical position of the application roller can be adjusted. Preferably, the coating device 16 and the application rollers 17a, 17b extend transverse to the direction of movement H over the entire area to be coated. Optionally, the coating device 16 can comprise further elements not shown in the figures, such as a powder container, which elements can be uncoupled from the coating device 16 and/or carried along with it in the direction of movement H. In this case the coating device 16 comprises at least one coating unit which comprises the application rollers 17a, 17b and which is provided in the device 1 so as to be movable in the direction of movement H.

In a Cartesian coordinate system, the direction of movement H of the coating device 16 is parallel to the x-axis and the vertical direction V, in which the support 10 and thus also the building base are arranged to be movable, is parallel to the z-axis. The height adjustability of at least one application roller 17a, 17b thus means that the position of the application roller can be adjusted in the z-direction. The longitudinal directions, that is to say the longitudinal axes, (not shown in the figures) of the application rollers 17a, 17b each extend preferably in the y-direction.

Optionally, a radiant heater 17 is arranged in the process chamber 3, which radiant heater serves to heat the applied building material 15. For example, an infrared radiator can be provided as radiant heater 17.

The laser sintering or laser melting device 1 further contains an irradiation device 20 with a laser 21 that generates a laser beam 22, which is deflected by a deflecting device 23 and focused upon the working plane 7 by way of a focusing device 24 through a coupling window 25, which coupling window is arranged at the upper sider of the process chamber 3 in the chamber wall 4.

Furthermore, the laser sintering or laser melting device 1 contains a control unit 29 by which the individual components of the device 1 are controlled in a coordinated manner to implement the building process. Alternatively, the control unit can also be arranged partly or completely outside the device. The control unit can comprise a CPU whose operation is controlled by a computer program (software). The computer program can be stored separately from the device on a storage medium from which it can be loaded into the device, in particular into the control unit.

Various types of powders can be used as a building material, in particular metal powders, plastic powders, ceramic powders, sand, filled or mixed powders.

During operation, in order to apply a powder layer, the support 10 is first lowered by an amount that corresponds to the desired layer thickness. The coating device 16 first moves to the storage container 14 and receives from it an amount of the building material 15 sufficient for the application of a layer. Then, the coating device 16 moves across the build area 8, there applies building material 15 in powder form to the building base or a powder layer already present and spreads the building material into a powder layer by means of at least one of the application rollers 17a, 17b. Coating takes place at least across the entire cross-section of the object 2 to be produced, preferably across the entire build area 8, i.e. the area bounded by the container wall 6. Optionally, the building material in powder form 15 is heated to a working temperature by means of a radiant heater 17.

Subsequently, the cross-section of the object 2 to be produced is scanned by the laser beam 22 so that the building material 15 in powder form is solidified at these locations that correspond to the cross-section of the object 2 to be produced. In doing so, the powder grains are partially or completely melted at these locations by means of the energy introduced by the radiation, so that after cooling they are present joined together as a solid body. These steps are repeated until the object 2 is completed and can be removed from the process chamber 3.

In order to calibrate or adjust the application rollers 17a, 17b of the additive manufacturing device 1, i.e. in particular to adjust their height relative to one another, a calibration method, also referred to as an adjustment method, is carried out in advance, i.e. preferably before the start of the manufacturing process and/or when the device 1 is put into operation and/or in case of need, by means of a detection device. Hereinafter, the detection device is described with reference to FIG. 2 and the calibration method is described with reference to FIGS. 3a, 3b and FIG. 4.

Figure 2:
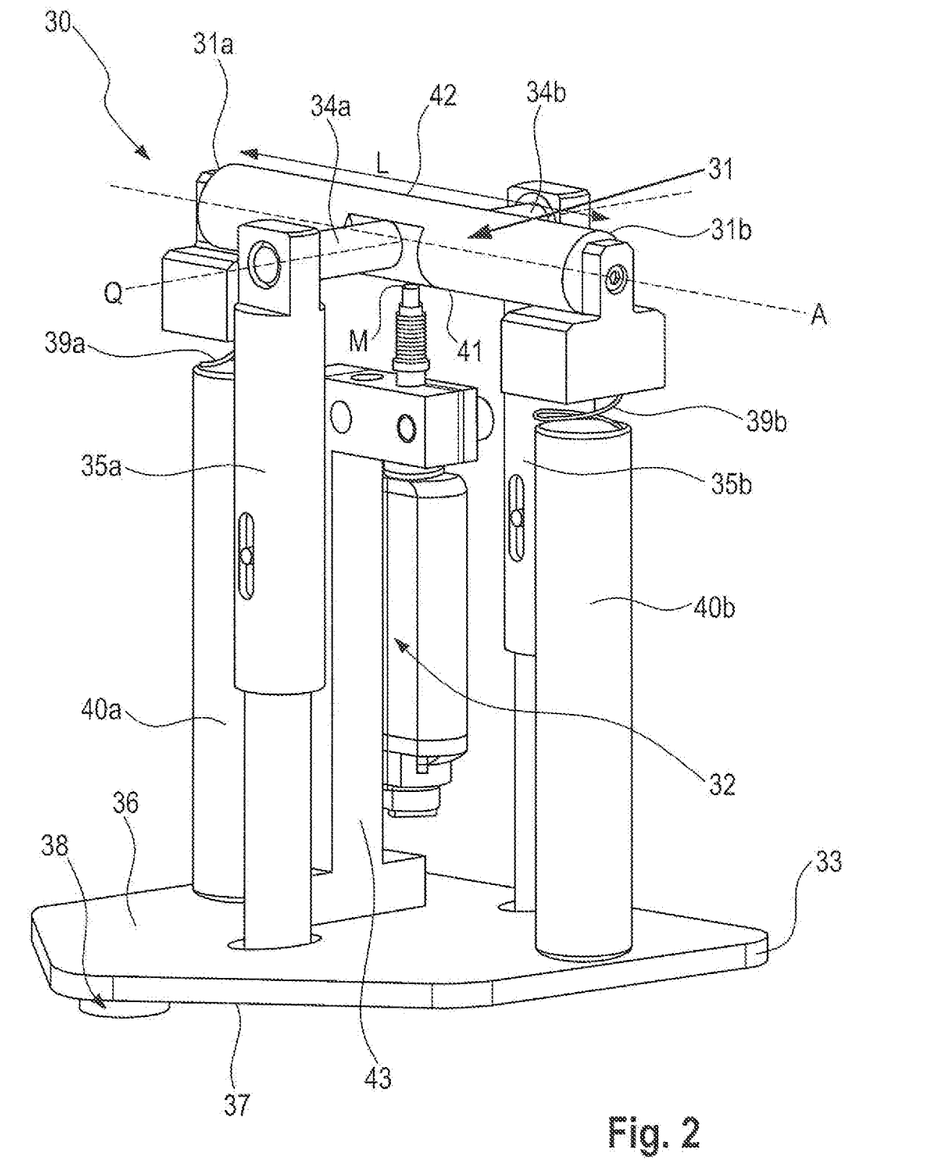
FIG. 2 shows a schematic, perspective view of a detection device according to the present invention, which detection device is intended for use in the device shown in FIG. 1.

The detection device 30 shown in FIG. 2 has a measuring element designed as a measuring roller 31, a detection unit 32 and a base designed as a support plate 33. The measuring roller 31 is preferably made of a hard material, such as hardened steel.

The measuring roller 31 has a substantially cylindrical shape with a longitudinal axis A. In relation to the cross-section of the measuring roller 31 perpendicular to the longitudinal axis A, the longitudinal axis A is central, i.e. runs through a center point of the circular cross-section (not shown in the figures). Along the longitudinal axis A, i.e. in the longitudinal direction of the measuring roller 31, the measuring roller 31 extends from a first end 31a to a second end 31b over a length L. Two holding elements designed as holding rods 34a, 34b are attached to the sides of the measuring roller 31, which holding elements extend perpendicular to the longitudinal axis A. The holding rods 34a, 34b are attached to the measuring roller 31 at opposing sides of the same and are provided centrally with respect to the length L of the measuring roller 31. The holding rods 34a, 34b have a common longitudinal axis which forms a transverse axis Q of the measuring roller 31. The transverse axis Q of the measuring roller 31 is perpendicular to the longitudinal axis A and intersects the measuring roller 31 centrally with respect to its length L. The holding rods 34a, 34b are each attached to a support pole 35a, 35b so that they can rotate about the transverse axis Q. The support poles 35a, 35b extend from the holding rods 34a, 34b substantially vertically downwards, i.e. perpendicular to the transverse axis Q, and are attached to the support plate 33 at their ends opposite the holding rods 34a, 34b. In this way, the measuring roller 31 is provided above the support plate 33 in a manner rotatable or tiltable about the transverse axis Q.

The length of the support poles 35a, 35b, i.e. the vertical extent of the support poles 35a, 35b from a surface 36 of the support plate 33 to the transverse axis Q is adjustable. For this purpose, the support poles 35a, 35b can be designed as telescopic rods, for example. Alternatively or additionally, at least one of the support poles 35a, 35b can comprise two rods each, a first rod being provided in a second rod so as to be displaceable along the vertical direction and being guided in the first rod by means of sliding bearings, wherein preferably one of the rods comprises vertically extending elongated holes and the other rod comprises pins engaging the elongated holes in order to limit a vertical displacement, i.e. a height displacement, of the rods with respect to one another. This allows the height, i.e. the vertical position, of the holding rods 34a, 34b and thus also of the measuring roller 31 to be adjusted in relation to the surface 36 of the support plate 33.

Furthermore, the detection device 30 comprises two pressing devices 40a, 40b. The first pressing device 40a is attached to the first end 31a of the measuring roller 31 and the second pressing device 40b is attached to the second end 31b of the measuring roller 31. The pressing devices 40a, 40b each extend from one end 31a, 31b of the measuring roller 31 substantially vertically downwards, i.e. perpendicular to the transverse axis Q of the measuring roller 31, and are each attached to the support plate 33 at their ends opposite the measuring roller 31. The pressing devices 40a, 40b are configured to exert a force on the measuring roller 31, which force is directed upwards, i.e. away from the support plate 33. For example, the pressing devices 40a, 40b can each comprise a spring 39a, 39b, wherein the spring force presses the measuring roller 31 upwards.

The support plate 33 has at least one fastening and/or centering element 38 at its underside 37. The fastening and/or centering element 38 serves to fasten the detection device 30 in the additive manufacturing device 1 described in FIG. 1, preferably to fasten it to the building base of the additive manufacturing device 1, and/or to center the detection device 30 in the additive manufacturing device 1, in particular with respect to the application rollers 17a, 17b of the coating device 16. Centering of the detection device 30 preferably means a reproducible positioning, in particular in a predetermined position, of the detection device 30 in the additive manufacturing device 1. The fastening and/or centering element 38 preferably has a quick-clamping system, for example a pin and/or a female connector, which can be introduced into a corresponding female connector or a corresponding pin of the additive manufacturing device 1, in particular of its building base. In FIG. 2 only one fastening and/or centering element 38 is shown, but it is also possible to provide several fastening and/or centering elements.

The detection unit 32 is attached to the support plate 33, for example by means of a further holder 43, and contacts a downwardly facing region of the cylinder-surface-shaped surface, or that is to say the underside 41, of the measuring roller 31, i.e. the side of the measuring roller 31 facing the support plate 33, at a measuring point M. In FIG. 2, the measuring point M is provided, merely by way of example, centrally with respect to the length L of the measuring roller 31, i.e. vertically below the transverse axis Q. The detection unit 32 is configured to detect a distance between the measuring point M and a reference point (not shown in FIG. 2). The reference point is located outside the coating device 16 and can be, for example, an internal reference point of the detection unit 32 or a reference point of the detection device 30 outside the detection unit 32, such as a point on the surface 36 of the support plate 33. Preferably, the measuring point M and the reference point (not shown in FIG. 2) are located on a straight line, also denoted as a comparison line, which extends in the vertical direction. In other words, the measuring point M is preferably located vertically above the reference point, i.e. the detection unit 32 is configured to detect a vertical distance between the measuring point M and the reference point.

In the present exemplary embodiment, the detection unit 32 is designed as a measuring probe that detects the position of the measuring point M with respect to the reference point, e.g. by means of a sensor, and calculates and/or displays the distance between the measuring point M and the reference point. For displaying the distance, the detection unit 32 can, for example, comprise a display device, e.g. an indicating gauge (not shown in the figures). The distance can be calculated internally in the measuring probe. Alternatively or in addition, the detection unit 32 can be connected to an internal or external data processor in which the distance is calculated by means of suitable software and/or the calculated distance can be output via a data output interface (not shown in the figures). For example, the control unit 29 of the additive manufacturing device 1 can be used as data processor.

Figure 3A:
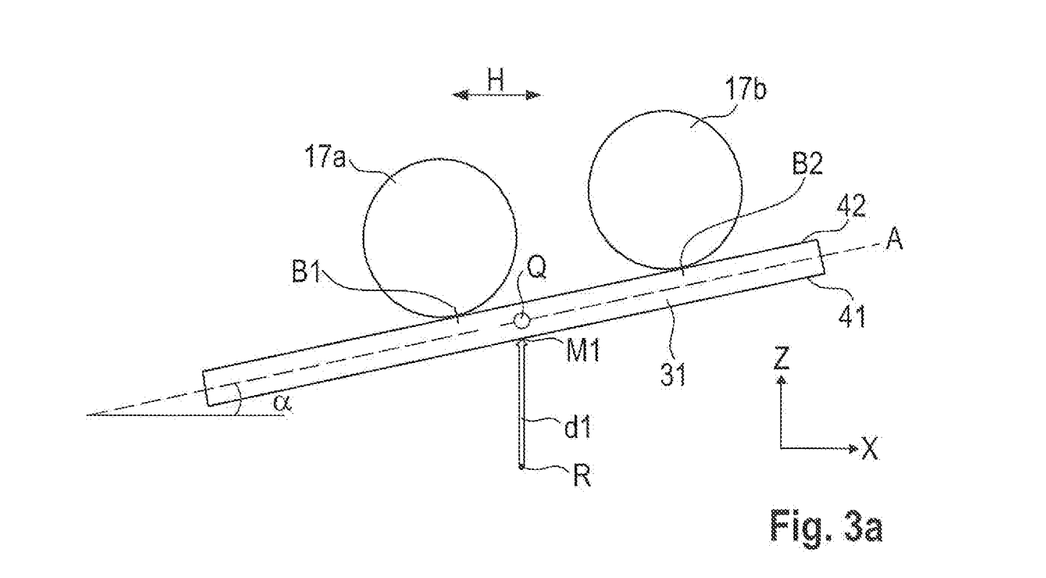
FIG. 3a shows the application rollers shown in FIG. 1 in a first measuring position and FIG. 3b in a second measuring position to illustrate the calibration method according to the invention.
Figure 3B:
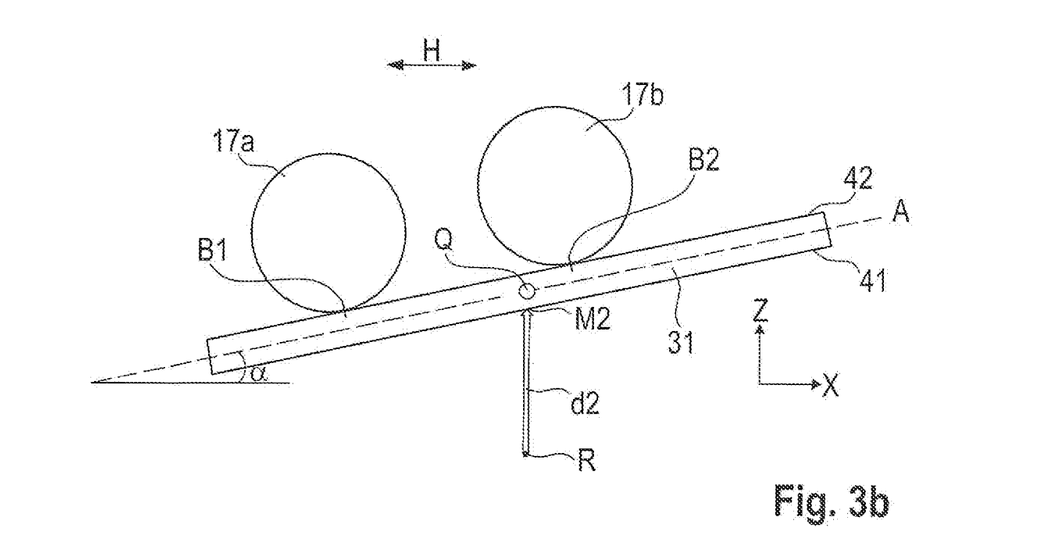
Figure 4:
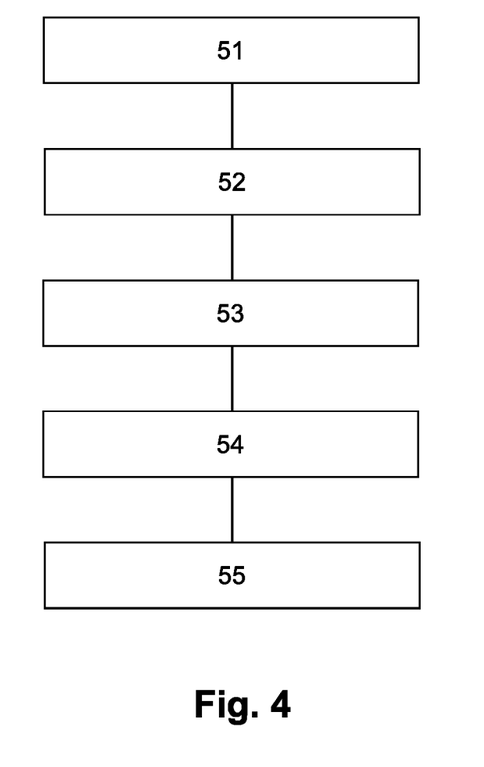
FIG. 4 is a schematic diagram which schematically shows the steps of the calibration method according to the invention.

Hereinafter, a calibration method carried out using detection device 30 is described with reference to FIGS. 3a, 3b and FIG. 4. FIGS. 3a and 3b each show a view of the first and second application rollers 17a, 17b and the measuring roller 31 in cross-section, with the sectional plane being substantially perpendicular to the longitudinal extension of the application rollers and parallel to the longitudinal direction A of the measuring roller, i.e. parallel to the x-z plane. Furthermore, FIGS. 3a, 3b each schematically depict the reference point as well as the measuring points, which measuring points are detected by the detection unit 32 not shown in FIGS. 3a, 3b.

In the calibration method, in a first step 51, the detection device 30 is attached in the additive manufacturing device 1 in a manner fixed in place. For this purpose, the support plate 33 is attached to or onto the building base of the additive manufacturing device 1 by means of the fastening and/or centering element 38. In doing so, the detection device 30 is preferably positioned and aligned in the additive manufacturing device 1 in such a way that the transverse axis Q is substantially perpendicular to the direction of movement H of the coating device 16 and substantially parallel to the longitudinal direction of the application rollers 17a, 17b. Thus, the transverse axis Q is located in a horizontal plane of the additive manufacturing device 1 parallel to the x-y plane. The support poles 35a, 35b and the pressing devices 40a, 40b extend substantially in the z-direction of the additive manufacturing device 1, i.e. parallel to the vertical direction V.

Subsequently, an upward facing region of the cylinder-surface-shaped surface, more specifically the top side 42, of the measuring roller 31 is brought into contact with the two application rollers 17a, 17b of the coating device 16, for example by moving the support 10 of the additive manufacturing device 1 upwards in the vertical direction V, i.e. in the z-direction. Preferably, the vertical position to which the support 10 is moved in this step is defined in advance. The top side 42 of the measuring roller 31 contacts the first application roller 17a at a first contact point B1 and the second application roller 17b at a second contact point B2. Since the application rollers 17a, 17b are usually not yet at the same height at this point in time, the measuring roller 31 is tilted about the transverse axis Q with respect to the x-y plane of the additive manufacturing device 1. Thus, the longitudinal axis A of the measuring roller 31 is provided at an angle α to the x-y-plane.

In a second step 52 of the calibration method, the coating device 16 is positioned in a first measuring position, which is shown in FIG. 3a, for example by moving the coating device 16 in the direction of movement H and/or by bringing the top side 42 of the measuring roller 31 into contact with the two application rollers 17a, 17b, as described above. In this first measuring position the detection unit 32 contacts the underside 41 of the measuring roller 31 in a first measuring point M1. Preferably, as shown in FIG. 3a, the first measuring point M1 is located between the two contact points B1 and B2 with regard to a horizontal direction, at which contact points the top side 42 of the measuring roller 31 contacts the first and second application roller 17a, 17b, respectively. In the second step 52, the detection unit 32 detects a first distance d1 between the reference point R and the first measuring point M1.

Subsequently, in a third step 53 of the calibration method, the coating device 16 is positioned in a second measuring position, which is shown in FIG. 3b, by moving in the direction of movement H. In the exemplarily embodiment shown, the coating device is moved from the first measuring position (FIG. 3a) to the left in order to be positioned in the second measuring position shown in FIG. 3b. During the movement of the coating device, the measuring roller 31 is still pressed from below against the application rollers 17a, 17b by the pressing devices 40a, 40b and/or the height adjustability of the support poles 35a, 35b, and contacts the application rollers. In the second measuring position shown in FIG. 3b the detection unit 32 contacts the underside 41 of the measuring roller 31 in a second measuring point M2. Preferably, as shown in FIG. 3b, the second measuring point M2 is located between the two contact points B1 and B2 with regard to a horizontal direction, at which contact points the top side 42 of the measuring roller 31 contacts the first and second application roller 17a, 17b, respectively. In the third step 53, the detection unit 32 detects a second distance d2 between the reference point R and the second measuring point M2.

As a result of the measuring roller 31, or rather its longitudinal axis A, being tilted about the transverse axis Q with regard to a horizontal direction in the x-y plane, when the coating device 16 is moved in the direction of movement H, the distances of the contact points B1, B2 change in relation to the stationary detection unit 32 and thus also the distance of the reference point R to the measuring point on the underside 41 of the measuring roller 31 changes. Thus, the first distance d1 detected in the first measuring position and the second distance d2 detected in the second measuring position differ from one another. In the present exemplary embodiment, the second distance d2 is larger than the first distance d1.

In a fourth step 54 of the calibration method, a correction value for the first and/or second application roller 17a, 17b is determined from the first distance d1 determined in the second step 52 and the second distance d2 determined in the third step 53. For instance, the correction value can be calculated on the basis of a difference between the first and the second distance and/or on the basis of a distance by which the coating device is moved from the first measuring position to the second measuring position and/or on the basis of the (measured or calculated) angle α by which the longitudinal axis A of the measuring roller 31 is tilted with respect to the x-y plane. Alternatively or additionally, the correction value can be determined based on a geometric calculation.

In a fifth step 55 of the calibration method, a position setting of the first and/or the second application roller 17a, 17b is adjusted according to the correction value determined in the fourth step 54. In particular, a relative vertical distance of the application rollers 17a, 17b to one another, i.e. a difference in height between the first application roller 17a and the second application roller 17b, is reduced.

Optionally, in the calibration method, the above-described second step 52, the third step 53, the fourth step 54 and the fifth step 55 are repeated once or several times, i.e. steps 52 to 55 are carried out iteratively. In doing so, the number of repetitions can be predefined and/or steps 52 to 55 can be repeated until the correction value falls below a predefined threshold value. Steps 52 to 55 are preferably carried out until the application rollers 17a, 17b or their undersides are substantially at the same height, i.e. until the first measuring point M1 and the second measuring point M2 are substantially identical. This is equivalent to the first distance d1 and the second distance d2 being substantially the same. The measuring roller 31 is then substantially horizontal, i.e. the angle α, which the longitudinal axis A of the measuring roller 31 forms with the x-y plane, is essentially zero (not shown in the figures). The contact points B1, B2, at which the measuring roller 31 contacts the application rollers 17a, 17b are then located on the lower edges, i.e. the respective lower boundaries, of the application rollers.

The detection device 30 can deviate from the embodiment described above. For example, the base can be designed as an element different from a plate or the detection device can be designed without a base, wherein the support poles 35a, 35b and the pressing devices 40a, 40b can, for example, be attached directly to the building base of the laser sintering or laser melting device 1.

The detection device 30 described above has two holding rods 34a, 34b and two support poles 35a, 35b. Alternatively, for the rotatable or tiltable attachment of the measuring roller 31, the detection device can also have only one holding rod and/or only one or more than two pressing devices for exerting an upward force on the measuring roller 31.

The detection unit 32 described above is designed as a measuring probe which detects a distance, preferably a vertical distance, between the measuring point M and the reference point R as a position reference value with respect to the reference point R and the measuring point M. Alternatively, the detection unit 32 can be configured to detect a measured value other than the distance as a position reference value with respect to the reference point R and the measuring point M. The position reference value can, for example, be a voltage and/or a force, in particular a spring force, and/or an angle. The position reference value is preferably a measure for the distance, more preferably for the vertical distance, between the reference point R and the measuring point M. Preferably, the position reference value is proportional to the (vertical) distance between the reference point R and the measuring point M.

In general, in the calibration method described above with reference to FIGS. 3a, 3b and FIG. 4, a first and a second position reference value is detected with respect to the reference point R and the first and second measuring point M1, M2, respectively, the measuring point in each case being a point of intersection of the underside 41 of the measuring roller 31, which underside is a common reference line of the first and second application rollers 17a, 17b, with a predefined comparison line containing the reference point and extending in a predefined direction, the predefined direction preferably being the vertical direction. With this arrangement, the common reference line of the first and second application rollers 17a, 17b, i.e. the underside 41 of the measuring roller 31, is arranged parallel to the top side 42 of the measuring roller 31, which top side is a tangent to the undersides of the application rollers 17a, 17b.

An element different from the underside 41 of the measuring roller 31 can also be used as a reference line. Furthermore, a common reference plane of the first and second application rollers 17a, 17b can also be provided instead of the reference line, wherein the first and second measuring point in each case is a point of intersection of the common reference plane with the predefined comparison line. The reference plane is parallel to a tangential plane to the underside of the application rollers 17a, 17b. For example, instead of the measuring roller 31, another measuring element with a common reference line or a common reference plane of the first and second application rollers can be provided. For example, the measuring element can be designed cuboid-shaped or as a thin plate, with a top side of the cuboid or plate serving as a tangential plane and an underside of the cuboid or plate serving as a reference plane. Alternatively, the common reference line can be a tangent to the underside of the first and second application rollers or the common reference plane can be a tangent plane to the underside of the first and second application rollers.

Figure 5A:
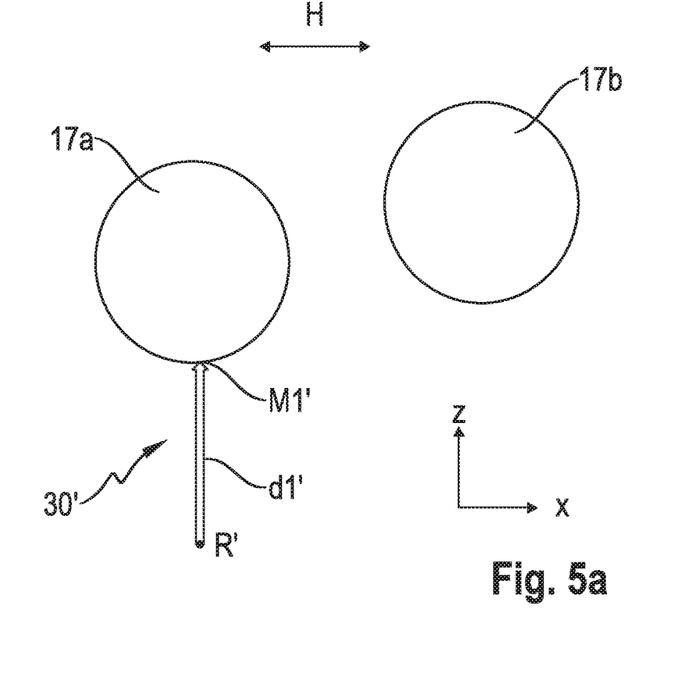
FIG. 5a and FIG. 5b show a schematic view of a further embodiment of a detection device according to the present invention for use in the device shown in FIG. 1, wherein the application rollers shown in FIG. 1 are schematically shown in FIG. 5a in a first measuring position and in FIG. 5b in a second measuring position.
Figure 5B:
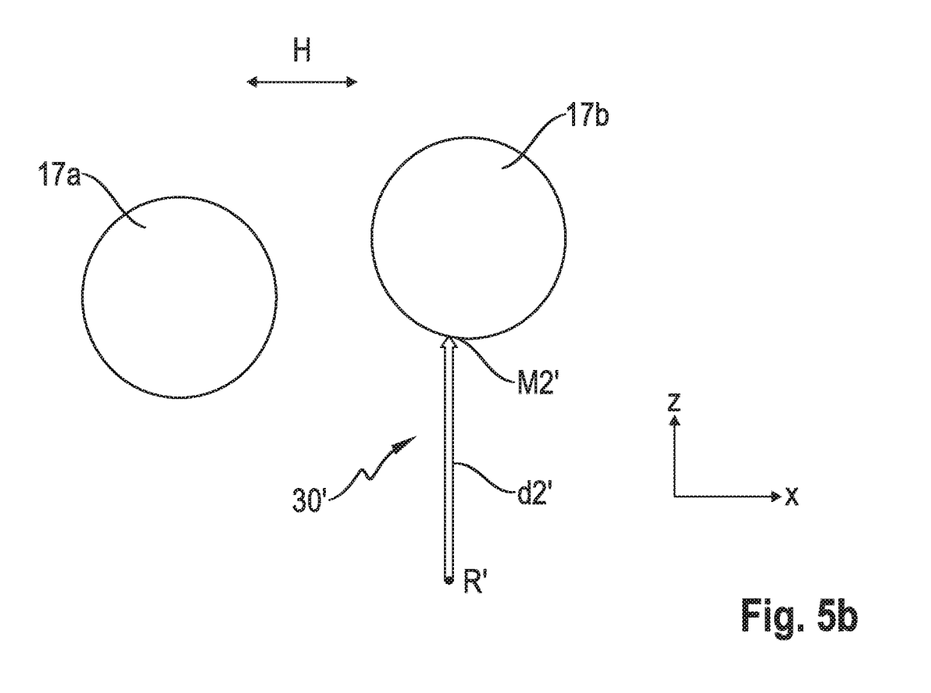

Hereinafter, a further embodiment of a detection device 30' according to the invention is described with reference to FIG. 5a and FIG. 5b. FIG. 5a schematically depicts, analogous to FIG. 3a, the application rollers 17a, 17b in a first measuring position and FIG. 5b schematically depicts, analogous to FIG. 3b, the application rollers 17a, 17b in a second measuring position.

The detection device 30' is configured to detect in a respective measuring position of the coating device 16 as a position reference value a distance, preferably a vertical distance, between a measuring point and a reference point R'. In the first measuring position shown in FIG. 5a, the detection device 30' detects a first distance d1' between the reference point R' and a first measuring point M1' and in the second measuring position shown in FIG. 5b, the detection device 30' detects a second distance d2' between the reference point R' and a second measuring point M2'. The measuring points M1', M2' are each located directly on the surface, more specifically the underside, i.e. the side facing the building base 11, 12, of the application rollers 17a, 17b.

In general, the detection device 30' is configured to detect in the respective measuring position of the coating device 16 a measuring point M1', M2' which is a point of intersection of a comparison line with the underside of the first or second application roller 17a, 17b, the comparison line including the reference point R' and extending in a predefined direction, the predefined direction preferably being the vertical direction.

Preferably, the detection device 30' is configured to detect in a measuring position the respective measuring point M1', M2' or the respective distance d1', d2' by means of a contactless measuring method. For example, the detection device 30' can comprise a radiation source which emits an electromagnetic beam, preferably a laser beam, as well as a detector for detecting the electromagnetic beam, in particular the electromagnetic beam reflected at the measuring point M1', M2', i.e. at the surface of the first or second application roller 17a, 17b. The reference point R' can, for example, be a point or location where the radiation source or the detector is located.

The calibration method using the detection device 30' according to the further embodiment is implemented analogously to the calibration method described above. The third step 53 of the calibration method, in which the coating device 16 is positioned in a second or generally a further measuring position and the detection unit 30' detects a second or generally a further distance d2' between the reference point R' and the measuring point M2' assigned to the second or further measuring position, is preferably carried out several times. In this way, a plurality of position reference values or distances are detected at a plurality of measuring positions. In the fourth step 54, the correction value is determined from the plurality of detected position reference values or distances. Further preferably, the plurality of position reference values or distances are detected continuously during movement of the coating device 16 in the direction of movement H, or iteratively. In this way, for example, a continuous detection of the position reference value or distance can be carried out depending on a movement position of the coating device 16.

In the embodiments described above, the direction of movement H of the coating device 16 is a horizontal direction which defines the x-axis of a Cartesian coordinate system. Thus, the application rollers 17a, 17b or the application elements are aligned in the horizontal direction. However, within the scope of the present invention it is also possible that the direction of movement H of the coating device 16 differs from a horizontal direction or comprises at least one vertical directional component. In general, in the calibration method described above the application rollers 17a, 17b or the application elements are being aligned in the direction of movement of the coating device.

The additive manufacturing device described with respect to FIG. 1 is a laser sintering or laser melting device. The embodiment of a laser sintering or laser melting device is merely exemplary, the detection device according to the invention and the calibration method according to the invention can also be used or applied in other additive manufacturing devices.

The above-described application elements of the additive manufacturing device are designed as application rollers 17a, 17b. The present invention can also be applied to coating devices which have at least one application element that is designed differently from an application roller. For example, the application element(s) can be designed as an application blade or as a flexible application element, such as a brush or a lip or a doctor blade, and/or can comprise such an application element. The coating device can also comprise more than two application elements and/or the application elements can be of different design.

The irradiation device of the additive manufacturing device can, for example, comprise one or more gas or solid-state lasers or any other type of laser such as laser diodes, in particular VCSEL (Vertical Cavity Surface Emitting Laser) or VECSEL (Vertical External Cavity Surface Emitting Laser), or a row of these lasers. Instead of deflecting a beam, it is also possible to use irradiation with a movable line irradiation device. In general, any device by means of which energy as wave radiation or particle radiation can be applied selectively to a layer of the building material can be used as an irradiation device. The invention can also be applied to selective mask sintering, in which a widespread light source and a mask are used, or to high-speed sintering (HSS), in which a material is selectively applied to the building material, which material increases (absorption sintering) or decreases (inhibition sintering) the radiation absorption at the corresponding locations, and then is unselectively irradiated over a large area or with a movable line irradiation device. Instead of introducing energy, the selective solidification of the applied building material can also be achieved by 3D printing, for example by applying an adhesive. In general, the invention relates to the additive manufacturing of an object by means of layer-wise application and selective solidification of a building material, irrespective of the manner in which the building material is solidified. Instead of a powder, other suitable materials can also be used as a building material.

In general, the invention can be applied in any device for additively manufacturing of a three-dimensional object by layer-wise application and selective solidification of a building material.

The invention claimed is:

1. A calibration method for calibrating a coating unit of an additive manufacturing device using a detection device, wherein the additive manufacturing device is configured to produce a three-dimensional object on a building base by applying a building material layer by layer and selectively solidifying a layer of the building material at locations corresponding to a cross-section of the object to be produced in the layer, wherein, for an application of the layer, the coating unit is moved in at least one direction of movement across a build area of the manufacturing device, wherein the coating unit comprises a first application element and a second application element which are spaced from one another in the at least one direction of movement of the coating unit, and wherein the detection device is configured to detect at least one position reference value of the coating unit with respect to a reference point outside the coating unit and a measuring point assigned to the coating unit, the method comprising at least the steps of:
  a) positioning the coating unit in a first measuring position and detecting a first position reference value of the coating unit with respect to the reference point and a first measuring point assigned to the coating unit at the first measuring position;
  b) positioning the coating unit in a second measuring position by moving the coating unit in the at least one direction of movement and detecting a second position reference value of the coating unit with respect to the reference point and a second measuring point assigned to the coating unit at the second measuring position; and
  c) determining a correction value for a position and/or orientation of the first application element and/or of the second application element, the correction value being determined based on a comparison of the detected first position reference value and the detected second position reference value.

2. The calibration method according to claim 1, wherein the at least one position reference value detected by the detection device includes information about a vertical position of the measuring point.

3. The calibration method according to claim 1, wherein the detection device is mounted in the manufacturing device and fixed in place at least while the calibration method is carried out.

4. The calibration method according to claim 1, wherein the first measuring point and the second measuring point each is a point of intersection of a common reference line of the first and second application elements with a predefined comparison line and/or of a common reference plane of the first and second application elements with the predefined comparison line, the predefined comparison line including the reference point and extending in a predefined direction.

5. The calibration method according to claim 4, wherein the detection device comprises at least one measuring element extending in a longitudinal direction, a surface of the at least one measuring element facing the building base during operation determining the common reference line; and wherein the detection device comprises a pressing device for bringing and/or holding the at least one measuring element in contact with the first and second application elements.

6. The calibration method according to claim 4, wherein the detection device further comprises at least one measuring element extending in a longitudinal direction, a surface of the at least one measuring element facing the building base during operation determining the common reference line, wherein the measuring element is provided at the detection device in a manner tiltable about an axis transverse to the longitudinal direction.

7. The calibration method according to claim 1, wherein the first and second application elements each comprise a surface facing the building base during operation, wherein the first measuring point is a point of intersection of a comparison line with the surface of the first application element and/or the second measuring point is a point of intersection of the comparison line with the surface of the second application element, and wherein the comparison line includes the reference point and extends in a predefined direction.

8. The calibration method according to claim 7, wherein step b) is carried out a plurality of times for detecting a plurality of position reference values at a plurality of measuring positions and wherein in step c) the correction value is determined from the plurality of detected position reference values, and wherein the detection of the plurality of position reference values is carried out continuously during movement of the coating unit in the at least one direction of movement or in successive steps.

9. The calibration method according to claim 7, wherein the detection device comprises a radiation source emitting an electromagnetic beam, and a detector for detecting the electromagnetic beam reflected at the measuring point.

10. The calibration method according to claim 1, wherein the correction value is determined based on a geometric calculation and/or a difference between the first position reference value and the second position reference value.

11. The calibration method according to claim 1, further comprising:

d) after determining of the correction value, adjusting a position setting of the first and/or the second application element according to the determined correction value.

12. The calibration method according to claim 11, wherein steps a) to d) are carried out iteratively, and wherein a number of iterations is predefined and/or steps a) to d) are carried out iteratively until the correction value falls below a predefined threshold value.

13. The calibration method according to claim 1, wherein the first and the second application elements each comprises a roller.

14. A manufacturing method for producing a three-dimensional object in an additive manufacturing device on a building base by applying a building material layer by layer and selectively solidifying a layer of the building material at locations corresponding to a cross-section of the object to be produced in the layer, wherein, for an application of the layer, a coating unit provided in the manufacturing device is moved in at least one direction of movement across a build area of the manufacturing device, wherein the coating unit comprises a first application element and a second application element which are spaced from one another in the at least one direction of movement of the coating unit, and wherein the manufacturing device further comprises a detection device configured to detect the at least one position reference value with respect to the reference point outside the coating unit and the measuring point; and wherein at least once, the calibration method according to claim 1 is carried out.

15. A detection device configured to carry out a calibration method for calibrating a coating unit of an additive manufacturing device, comprising the additive manufacturing device is configured for production of a three-dimensional object on a building base by applying a building material layer by layer and selectively solidifying a layer of the building material at locations corresponding to a cross-section of the object to be produced in the layer, the coating unit is provided so as to be movable in at least one direction of movement across a build area of the manufacturing device;

wherein the coating unit comprises a first application element and a second application element which are spaced from one another in the at least one direction of movement of the coating unit; and comprises at least one measuring element extending in a longitudinal direction and having an upper surface that faces away from the building base during operation of the detection device, and a lower surface that faces toward the building base, the upper surface contacting the first and second application elements of the coating unit and the lower surface defining a measuring point; and wherein the detection device is configured to detect at least one position reference value of the coating unit with respect to a reference point outside the coating unit and the measuring point.

* * * * *